United States Patent
Lagerman (10) Patent No.: US 9,883,356 B2
(45) Date of Patent: Jan. 30, 2018

(54) NODE AND METHOD FOR PRIVATE MOBILE RADIO SERVICES

(71) Applicant: Telefonaktiebolaget L M Ericsson (publ), Stockholm (SE)

(72) Inventor: Mikael Lagerman, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/899,211

(22) PCT Filed: Jul. 12, 2013

(86) PCT No.: PCT/EP2013/064811
§ 371 (c)(1),
(2) Date: Dec. 17, 2015

(87) PCT Pub. No.: WO2015/003751
PCT Pub. Date: Jan. 15, 2015

(65) Prior Publication Data
US 2016/0150382 A1    May 26, 2016

(51) Int. Cl.
*H04W 4/10* (2009.01)
*H04W 12/02* (2009.01)
*H04W 60/04* (2009.01)
*H04W 4/08* (2009.01)
*H04W 60/00* (2009.01)
*H04W 84/10* (2009.01)

(52) U.S. Cl.
CPC .............. *H04W 4/10* (2013.01); *H04W 4/08* (2013.01); *H04W 12/02* (2013.01); *H04W 60/005* (2013.01); *H04W 60/04* (2013.01); *H04W 84/105* (2013.01)

(58) Field of Classification Search
CPC .......... H04B 2203/5445; H04W 16/20; H04W 84/12; H04W 84/105
See application file for complete search history.

(56) References Cited

U.S. PATENT DOCUMENTS 6,978,317 B2   12/2005  Anantha et al.
8,478,276 B1 *  7/2013  Koren .................. H04L 67/146
                                                                          455/416

(Continued)

OTHER PUBLICATIONS

Author Unknown, "Technical Specification Group Core Network and Terminals; Mobile radio interface Layer 3 specification; Core network protocols; Stage 3 (Release 12)," Technical Specification 24.008, Version 12.2.0, 3GPP Organizational Partners, Jun. 2013, 682 pages.

(Continued)

*Primary Examiner* — Bobbak Safaipour
(74) *Attorney, Agent, or Firm* — Withrow & Terranova, PLLC (57) ABSTRACT

Example embodiments described herein are directed towards a PTC node and wireless terminal, and corresponding methods therein, for extended PMR based services. According to some of the example embodiment, through use of a PTC node, a wireless terminal may be simultaneously registered with the public radio access based network and the PMR based network. Thus, a wireless terminal which is not directly connected (or is unable to connect to) a PMR based network may still receive messages originating from the PMR based network.

28 Claims, 8 Drawing Sheets

(56) References Cited

U.S. PATENT DOCUMENTS

| | | | |
|---|---|---|---|
| 9,295,020 B2* | 3/2016 | Ericson | H04W 60/005 |
| 9,342,719 B2* | 5/2016 | Martinez De Velasco Cortina | G06K 7/0008 |
| 2002/0069278 A1* | 6/2002 | Forslow | H04L 63/0227 709/225 |
| 2002/0099826 A1* | 7/2002 | Summers | H04L 12/4679 709/227 |
| 2004/0218611 A1* | 11/2004 | Kim | H04L 12/4633 370/401 |
| 2006/0072517 A1 | 4/2006 | Barrow et al. | |
| 2009/0031415 A1* | 1/2009 | Aldridge | H04L 63/0272 726/15 |
| 2010/0304737 A1 | 12/2010 | Jain et al. | |
| 2011/0231654 A1* | 9/2011 | Somadder | H04L 12/5691 713/153 |
| 2012/0149421 A1 | 6/2012 | Korus et al. | |
| 2013/0265997 A1* | 10/2013 | Gu | H04W 36/0022 370/338 |
| 2013/0283364 A1* | 10/2013 | Chang | H04L 49/70 726/12 |
| 2013/0326609 A1* | 12/2013 | Sharkey | H04L 63/0272 726/13 |
| 2014/0277788 A1* | 9/2014 | Forbes, Jr. | G05F 1/66 700/286 |
| 2016/0366250 A1* | 12/2016 | Lee | H04L 43/0876 |

OTHER PUBLICATIONS

Author Unknown, "Technical Specification Group Services and System Aspects; Generic Authentication Architecture (GAA); Generic Bootstrapping Architecture (GBA) (Release 12)," Technical Specification 33.220, Version 12.1.0, 3GPP Organizational Partners, Jun. 2013, 92 pages.

Author Unknown, "Technical Specification Group GSM/EDGE Radio Access Network; Generic Access Network (GAN); Stage 2 (Release 11)," Technical Specification 43.318, Version 11.0.0, 3GPP Organizational Partners, Sep. 2012, 128 pages.

International Search Report and Written Opinion for International Patent Application No. PCT/EP2013/064811, dated May 15, 2014, 8 pages.

* cited by examiner

NODE AND METHOD FOR PRIVATE MOBILE RADIO SERVICES

This application is a 35 U.S.C. § 371 national phase filing of International Application No. PCT/EP2013/064811, filed Jul. 12, 2013, the disclosure of which is incorporated herein by reference in its entirety.

TECHNICAL FIELD

Example embodiments described herein are directed towards a Private Mobile Radio (PMR) Tunnelling Controller (PTC) node and wireless terminal, and corresponding methods therein, for extended PMR based services. Extended PMR based services comprise a wireless terminal being able to be simultaneously registered to a public radio access based network and a PMR based network in order to receive PMR group communications.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Private Mobile Radio (PMR) systems are traditionally used for group communications in which organizations. PMR systems are provided, for example, via Terrestrial Trunked Radio (TETRA), Project 25 (P25), Ministry of Posts and Telegraph 1327 (MPT 1327), Qualcomm Chat (QChat), and Integrated Digital Enhanced Network (iDEN). These group communications are typically used by mission critical organizations. Examples of mission critical organizations may be the police, ambulances, etc. PMR based group communications may also be utilized by business critical users from government and enterprises in such branches as construction, transport, utility, etc.

SUMMARY

One of the challenges in deploying PMR based networks is providing extensive coverage with a relatively small customer base. For example, a single PMR network for a police force may have to serve twenty thousand officers providing support to a large area, resulting in a substantial cost per user. Furthermore, deployment of a private network requires time. Typical deployment times may range from five to ten years. Additionally, the substantial capital expenditure of procuring a private network (of any technology) and the operating expenditures of a PMR is also a high cost.

Thus, example embodiments presented herein enable instant coverage and coverage extension by reusing existing PMR based network infrastructure in combination with current and future wireless systems (e.g., public radio access based networks). According to some of the example embodiments, a new node may be introduced to the network which may assist in seamlessly providing support to PMR based networks and public radio access based wireless terminals, while maintaining the integrity of the legacy PMR system.

At least one example advantage of some of the example embodiments presented herein is the need for minimal protocol modification between the protocols of various networks. Another example advantage is lowered costs per PMR user. A further example advantage is shorter traffic latency as a wireless terminal will be able to receive communications from either a PMR or public radio access based network. Yet a further example advantage is increased security via mechanisms end-to-end communications. Such end-to-end communications eliminates the risk of leakage in communications from PMR and public radio access based systems.

Accordingly, some of the example embodiments are directed towards a method, in a PMR PTC node, for extending PMR group communications to a public radio access for a wireless terminal. The wireless terminal is served by the public radio access based network and a PMR based network. The method comprises receiving, from a gateway node in the public radio access based network, a registration request originating from the wireless terminal. The registration request comprises identification information for the wireless terminal. The method also comprises establishing access with the public radio access based network on behalf of the wireless terminal utilizing the identification information. The method further comprises establishing access with the PMR based network on behalf of the wireless terminal utilizing the identification information.

Some of the example embodiments are directed towards a PMR PTC node for extending PMR group communications to a public radio access for a wireless terminal. The wireless terminal is served by the public radio access based network and a PMR based network. The PTC node comprises radio circuitry configured to receive, from a gateway node in the public radio access based network, a registration request originating from the wireless terminal. The registration request comprises identification information for the wireless terminal. The PTC node further comprises processing circuitry which is configured to establish access with the public radio access based network on behalf of the wireless terminal utilizing the identification information. The processing circuitry is further configured to establish access with the PMR based network on behalf of the wireless terminal utilizing the identification information.

Some of the example embodiments are directed towards a method, in a wireless terminal, for participating in group communications with a public radio access based network and a PMR based network. The method comprises establishing a connection to a serving base station in the public radio access based network. The method further comprises sending, to a PMR PTC node a registration request. The method also comprises, upon registering with the PTC, receiving group communication originating from the public radio access based network and the PMR based network. It should be appreciated that such receiving does not necessarily occur simultaneously.

Some of the example embodiments are directed towards a wireless terminal for participating in group communications with a public radio access based network and a PMR based network. The wireless terminal comprises processing circuitry configured to establish a connection to a serving base station in the public radio access based network. The wireless terminal further comprises radio circuitry configured to send, to a PMR PTC node a registration request. Upon registering with the PTC node, the radio circuitry is further configured to receive group communication originating from the public radio access based network and the PMR based network. It should be appreciated that such receiving does not necessarily occur simultaneously.

DEFINITIONS

3GPP Third Generation Partnership Project
BSC Base Station Controller
E-UTRAN Evolved Universal Terrestrial Radio Access Network
EPC Evolved Packet Core
DNS Domain Name System
GERAN GSM/EDGE Radio Access Network
GSM Global System for Mobile Communications
HLR Home Location Register
HSS Home Subscriber Server
iDEN Integrated Digital Enhanced Network
IMEI International Mobile Equipment Identity
IMS Internet Protocol Multimedia Subsystem
IMSI International Mobile Subscriber Identity
IP Internet Protocol
ISI Inter-System Interface
LTE Long Term Evolution
MME Mobility Management Entity
MPT 1327 Ministry of Posts and Telegraph 1327
NAS Non-Access Stratum
NW Network
Project 25
PCRF Policy Control and Charging Rules Function
PGW PDN Gateway
PDN Packet Data Network
PMR Private Mobile Radio
PTC PMR Tunneling Controller
QChat Qualcomm Chat
RAN Radio Access Network
RAT Radio Access Type
RBS Radio Base Station
RNC Radio Network Controller
SAE System Architecture Evolution
SGW Serving Gateway
SwMI Switching and Management Infrastructure
TBS TETRA Base Station
TETRA Terrestrial Trunked Radio
UE User Equipment
UMB Ultra Mobile Broadband
UMTS Universal Mobile Telecommunications System
URL Uniform Resource Locator
UTRAN UMTS Terrestrial Radio Access Network
VPN Virtual Private Network
WCDMA Wideband Code Division Multiple Access
WiFi Wireless Fidelity
WiMax Worldwide Interoperability for Microwave Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN or E-UTRAN based system.

Example embodiments presented herein are directed towards extending PMR group communications to a public radio access network. Thus, some of the example embodiments presented herein provide a means for bridging legacy PMR based networks with public radio access based networks.

Figure 1:
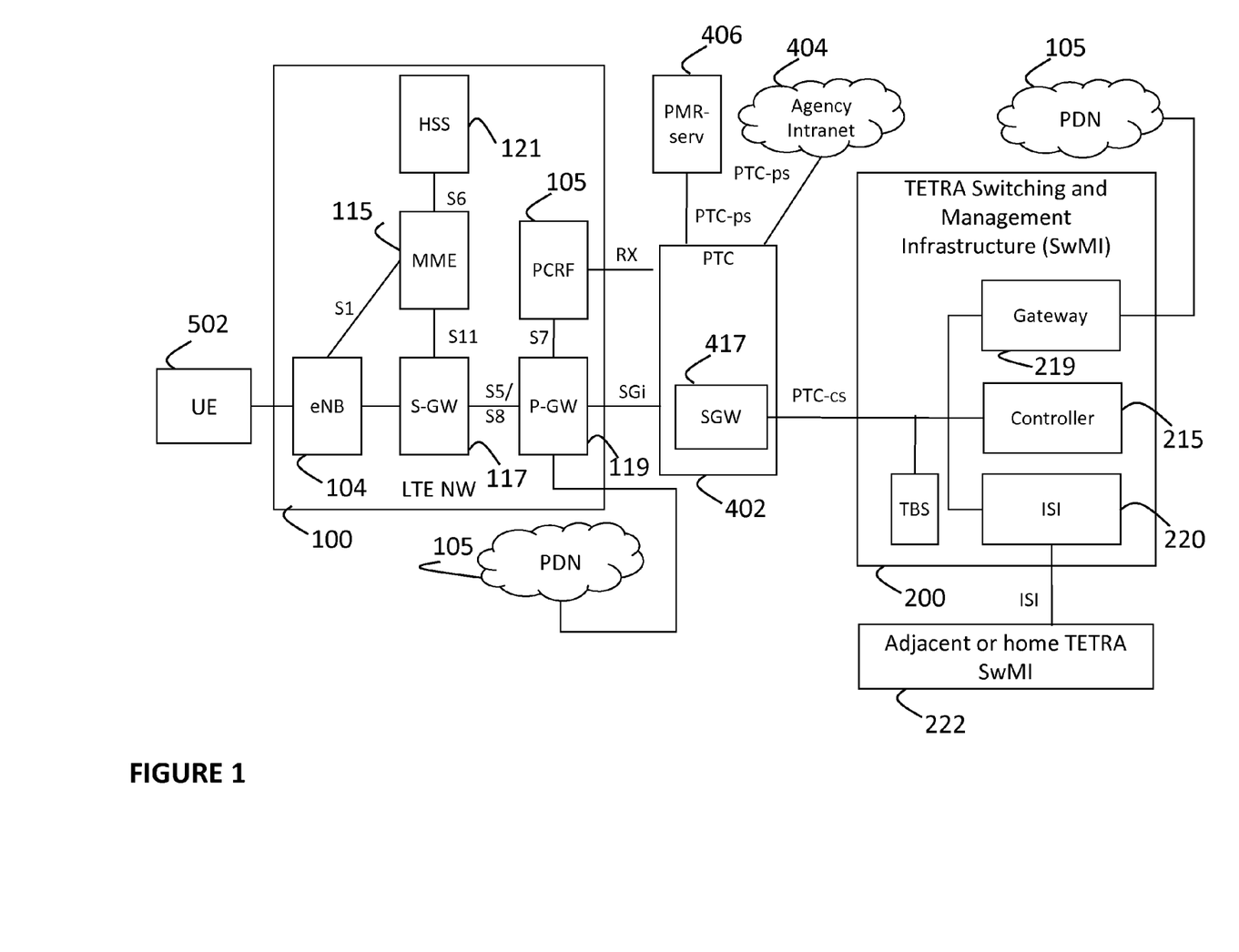
FIG. 1 is an illustration of a bridged PMR based network and a public radio access based network, according to some of the example embodiments.

FIG. 1 provides an illustrative example of a bridged network, according to some of the example embodiments. FIG. 1 illustrates a public radio access based network 100 and a PMR based network 200. In the example provided by FIG. 1, the public radio access based network is a LTE based network and the PMR based network is a TETRA based network. It should be appreciated that the use of an LTE network and a TETRA networked are provided merely as examples. The public radio access based network may comprise WCDMA, WiMax, UMB, WiFi, GSM, or any other wireless system which is publically accessible. The PMR based network may comprise P25, MPT 1327, QChat, iDEN, or any other PMR based network known in the art.

The public radio access network 100 of FIG. 1 may comprise a radio base station 104 which may assist a wireless terminal, or user equipment, 502 in accessing the public radio access based network. The public radio access based network 100 may also comprise a Mobility Management Entity (MME) 115, which may be responsible for mobility management, connectivity management, idle mode UE tracking, paging procedures, attachment and activation procedures, and message transfer. The public radio access based network 100 may also comprise a Serving Gateway (SGW) 117, which may be responsible for the routing and forwarding of data packets. The public radio access based network 100 may also include a Packet data network Gateway (PGW) 119, which may be responsible for providing connectivity from the wireless terminal 502 to one or more PDN(s) 105. The MME 115 may be in communication with a Home Subscriber Server (HSS) 121, which may provide device identification information, an International Mobile Subscriber Identity (IMSI), subscription information, etc. The public radio access based network 100 may also comprise a Policy Control and Charging Rules Function (PCRF) 105 which may be accessed, by the PGW 119 and PTC node 402, for establishing policy control decisions and flow-based charging control functionalities.

The PMR based network 200 may comprise a gateway node 219 which is responsible for connection to the PDN 105, for example agency back office Intranet, Internet, etc. The PMR based network 200 may further comprise a controller 215 which is responsible for access control, usage right, session management, resource utilization (e.g., priority between users) and user mobility management (e.g., handover). The PMR based network 200 also comprises an Intersystem Interface (ISI) 220 that is responsible for enabling infrastructures supplied by different TETRA manufacturers to inter-operate with each other allowing interoperability between two or more PMR networks. The ISI 220 is in communications with any number of adjacent of home TETRA Switching and Management Infrastructure (SwMI) 222. The TETRA SwMI 200/222 may comprise any number of TETRA base stations (TBS). The purpose of the SwMI 222 is dual. In case the SwMI 200 is a visited network there is a need for a home network illustrated by SwMI 222. It may also be the SwMI 222 is the user equipment home network. Then the SwMI 222 illustrates one or several adjacent TETRA networks with roaming ability via the ISI.

According to some of the example embodiments, a PMR Tunnelling Controller (PTC) node 402 may be used to bridge the public radio access based network 100 and the PMR network 200. The PTC node 402 may comprise a SGW 417 that may be configured to establish, manage and terminate a VPN tunnel into the wireless terminal or user equipment 502 over the public access network. The PTC node 402 is in communications with an agency intranet 404 and a PMR based server 406, both of which may be associated with the organization for whom the PMR based service is for. The PTC node 402 may be used extend PMR based services for the wireless terminal, such that, PMR group communications are provided to the wireless terminal from both the public radio access based network 100 and the PMR based network 200. Furthermore, according to some of the example embodiments, the wireless terminal 502 may be configured to be served by both the public radio access based network 100 and the PMR based network 200, although it should be appreciated that such dual service is not required.

Figure 2:
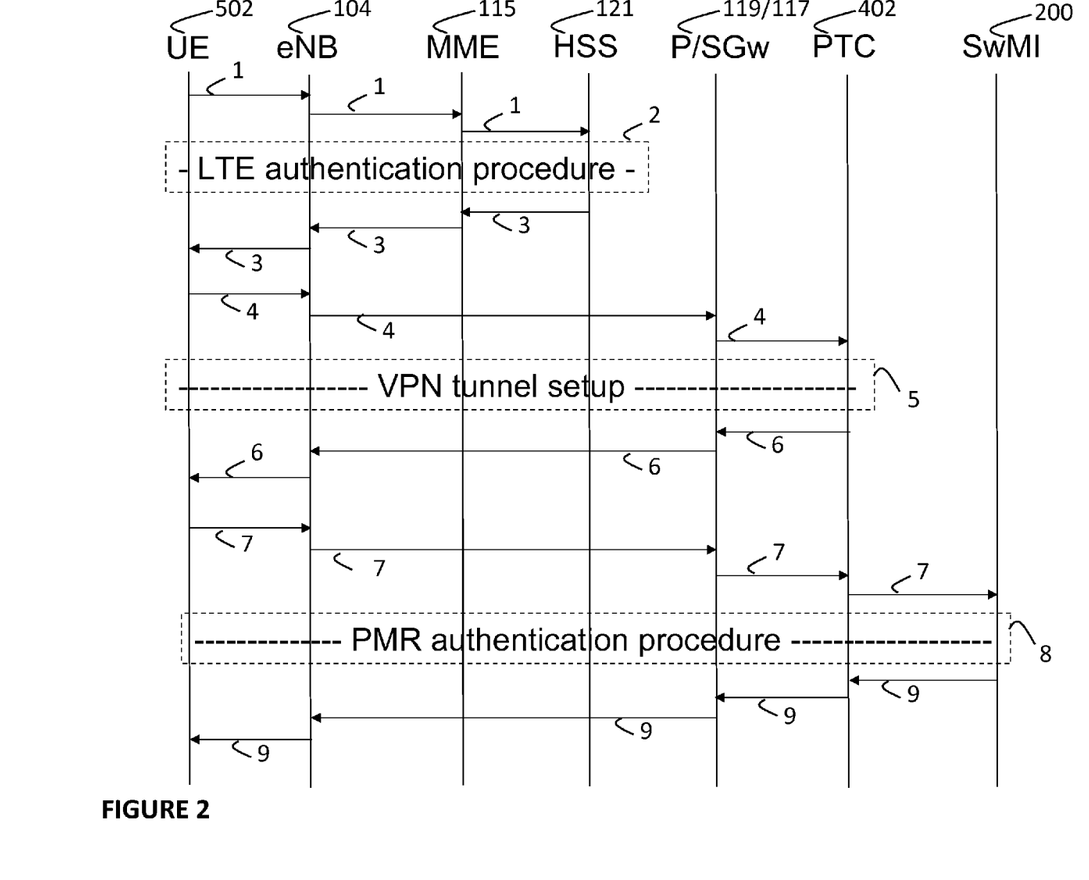
FIG. 2 is a messaging diagram depicting example message passing to provide the bridged configuration of FIG. 1, according to some of the example embodiments.

FIG. 2 illustrates a messaging diagram depicting an example of message passing for connecting a wireless terminal to the PMR based network via a public access based network, according to some of the example embodiments. It should be appreciated that the example provided in FIG. 2 assumes that a wireless terminal 502 is being served by a public radio access base station 104. Thereafter, a bridging is performed so that the wireless terminal may also access the PMR based network. It should be appreciated that the wireless terminal may first be connected to the PMR based network and thereafter a bridging to the public radio access based network may be provided.

First, the wireless terminal, or user equipment 502 may send an attach or registration request to a serving base station 104 (message 1). This attach or registration request is forwarded to the HSS 121 via the base station 104 and MME 115. The public radio access based network may thereafter initiate an authentication procedure (message/session 2). Finally, the HSS 121 may send a message to the wireless terminal 502 informing the wireless terminal that it is now connected to the public radio access based network (message 3). The connected message may be provided to the wireless terminal 502 via the MME 115 and the base station 104. It should be appreciated that such an attach and authentication procedure is further discussed in 3GPP TS 24.008. TS 33.220-224, etc. Thereafter, the wireless terminal 502 may send a PTC registration request to a PTC node 402 (message 4). The PTC registration request may be sent to the PTC node 402 via the base station 104, SGW 117 and PGW 119.

It should be appreciated that any number of PTC nodes may exist. Therefore, according to some of the example embodiments, the wireless terminal 502 may be configured to choose the specific PTC node for which the PTC registration request should be sent to. According to some of the example embodiments, the wireless terminal 502 may be configured to choose the PTC node based on an internal configuration. For example, a specific wireless terminal may be configured to always request a PTC registration with a same PTC node.

According to some of the example embodiments, the wireless terminal 502 may comprise a PTC table with a listing of suitable PTC nodes for PTC registration. According to this example embodiment, the wireless terminal 502 may choose the PTC node from the PTC listing based on any number of parameters, for example, a current location of the wireless terminal.

According to some of the example embodiments, the wireless terminal 502 may select the PTC node based on a URL or DNS based query. According to some of the example embodiment, the wireless terminal 502 may also select the PTC node based on any information, for example, subscription based information, provided by the HSS 121 or the PCRF 105.

According to some of the example embodiments, the PTC registration request may comprise an identification of the wireless terminal, for example, an IMEI or an IMSI. The PTC registration request may also comprise a username and password for accessing PMR based services. The PMR registration request may further comprise a return IP address of the wireless terminal.

According to some of the example embodiments, upon receiving the PTC registration request, the PTC node 402 may authenticate the wireless terminal and record the access path (e.g., originator IP address) used in the coming communications with the wireless terminal. Optionally, additional information such as geographical information or network location is stored in PTC node.

Optionally, the PTC node may initiate the wireless terminal 502 registration to the PMR based network as part of the PTC registration (messages 4-6) or this may be postponed until the PTC registration is completed. For example, the PTC node 402 may maintain any statistics and data related to the wireless terminal on behalf of the PMR based network. Furthermore, the PTC node 402 may receive any subscription or wireless terminal use rights via the PCRF 105. Furthermore, the PTC node 402 may engage in QoS and/or priority level negations.

Figure 3:
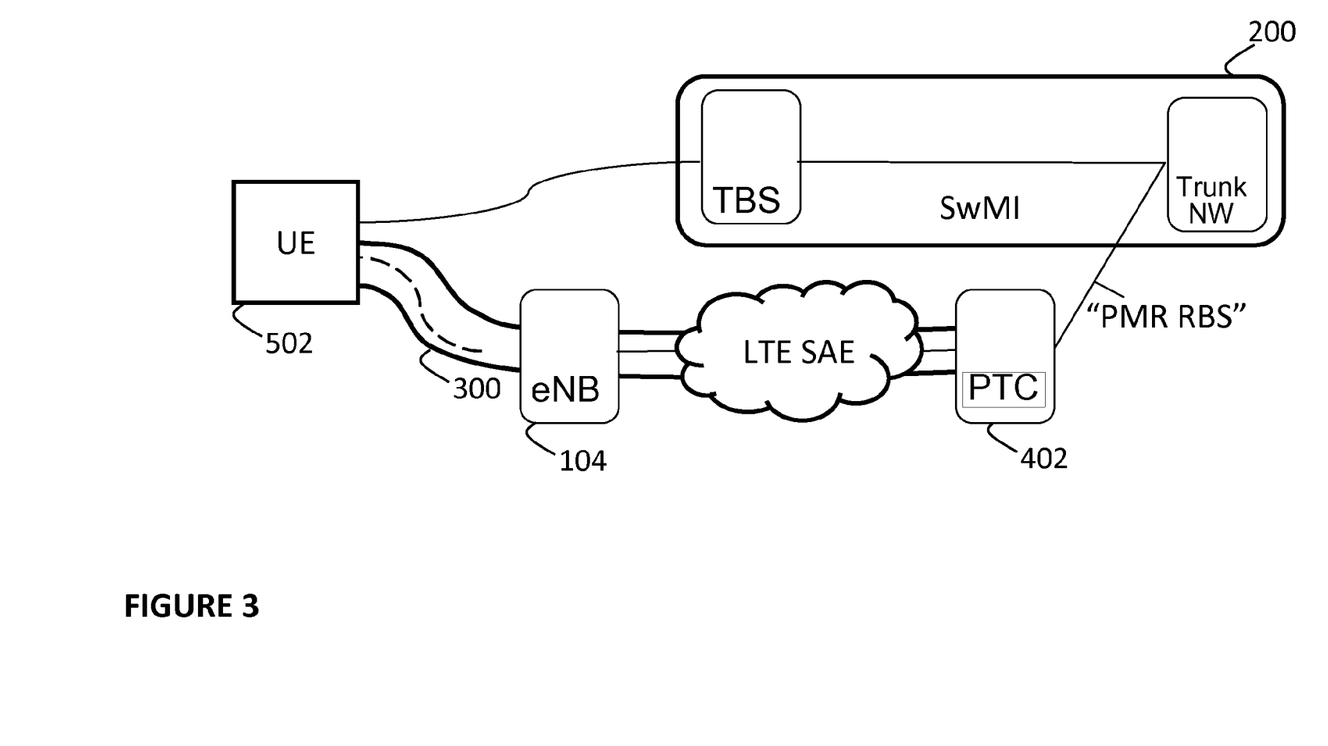
FIG. 3 is a depiction of a dual mode wireless terminal and its options to access the PMR based network directly, or via methods described herein, via a VPN tunnelling connection between a PTC node and a wireless terminal, according to some of the example embodiments.

According to some of the example embodiments, once the PTC node 402 has received the PTC registration request, the PTC node 402 may initiate the establishment of a VPN tunnel between the PTC and the wireless terminal (message 5). Such a VPN tunnel is illustrated in FIG. 3. As shown in FIG. 3, the VPN tunnel 300 may have endpoints established within the wireless terminal 502 and the PTC node 402. Thus, upon establishment of the VPN tunnel 300, the PTC node 402 and the wireless terminal 502 may send and receive encrypted messages to one another. Such messages may be transparently forwarded (e.g., a blind forwarding without taking any action) by the base station 104. It should be appreciated that the use of such a VPN tunnel is optional and therefore not required according to the example embodiments.

Once the wireless terminal registration has been completed, the PTC node 402 may send a registration complete message to the wireless terminal 502 (message 6). The registration complete message may be sent to the wireless terminal 502 via the PGW 119, the SGW 117 and the base station 104. It should also be appreciated that the registration complete message may be sent directly to the wireless terminal 502 via a VPN tunnel if such a tunnel has been established.

It should be appreciated that during the PTC registration process, the PTC node 402 may determine whether or not the wireless terminal 502 is a dual functioning wireless terminal, for example, if the wireless terminal is capable of being served by both the PMR based network 200 and the public radio access based network 100. If the PTC node 402 determines that the wireless terminal 502 is a dual functioning device, the PTC node 402 may thereafter determine if the wireless terminal has previously registered with the PMR based network 200. If not, the registration complete message (message 6) may comprise instructions for the wireless terminal to attach or register with the PMR based network 200. In such a case, the wireless terminal may send a request message to the PTC node 402 (message 7). It should be appreciated that this request message may be sent via the VPN tunnel if such a tunnel has been established. Alternatively, the request message may be sent to the PTC node 402 via the PGW 119.

Upon receiving the request message, the PTC node 402 may forward the message or communication with the SwMI interface 200 to begin the registration and/or authentication procedure with the PMR based network (message 8). During the registration of the wireless terminal, the PTC node 402 may initiate a PMR authentication procedure. During the PMR authentication procedure, the PTC node 402 may retrieve any authentication information from the SwMI 200, the PS-server 406 or the agency intranet 404 (message 8). It should be appreciated that the request message (message 6) may comprise similar identification and authentication information as comprised in the PMR registration request (message 1). Such information may be used in the PMR authentication procedure (message 8). Thereafter, the SwMI 200 and/or PTC node 402 may send a message to the wireless terminal 502 informing the wireless terminal that the registration and/or authentication procedure with the PMR based network is complete (message 9).

Thus, upon the PMR registration process, the wireless terminal 502 will be registered, and therefore able to receive group communications from, both the public radio access based network 100 and the PMR based network 200.

According to some of the example embodiments, the wireless terminal 502 may comprise dual functionality, thus, the wireless terminal may be capable of being served by both the public radio access based network 100 and the PMR based network 200. According to some of the example embodiments, the PMR based network, for example the PMR controller 215, may decide which network is most suitable for a wireless terminal with dual functionality at any given time.

This decision may be based on any number of factors. For example, the decision of which network may be most suitable may be based on charging and financial factors. Thus, it may be preferred to have the dual functioning wireless terminal to be served by the PMR based network 200, which will most likely be owned by the organization utilizing the PMR group communications. The decision of which network may be most suitable may also be based on coverage availability, network congestion, etc. Once a decision has been reached, the PMR based controller may send a RAT type change request to the PTC node 402. The PTC node 402, may thereafter send a request to the wireless terminal to initiate a handover to either the public radio access based network of the PMR based network, as requested by the PMR based controller 215. It should be appreciated that the RAT type change request need not be limited to the public radio access based network that the wireless terminal is currently registered to. The RAT type change request may be directed towards any public radio access based network, for example, WiFi.

It should further be appreciated that the PMR based controller may also provide instructions to the PTC node 402 regarding a most suitable PMR based radio base station for the wireless terminal when the wireless terminal is being served by the PMR based network 200. According to some of the example embodiments, the PTC node 402 may be configured to receive wireless terminal based measurements.

These measurements may be forwarded, by the PTC node 402, to the PMR based controller 215. Based on such measurements, the PMR based controller may decide the most suitable PMR based base station for the wireless terminal. According to some of the example embodiments, the wireless terminal measurement report may be modified (e.g., by the wireless terminal) to provide the PTC node 402 in the list of possible base stations the wireless terminal may be served by. Therefore, it is possible for the PTC node 402 to function as a radio base station and serve the wireless terminal on behalf of the PMR based network 200, for example, when the wireless terminal is not connected to the PMR based network (e.g., for wireless terminals which are not dual functioning).

Figure 4:
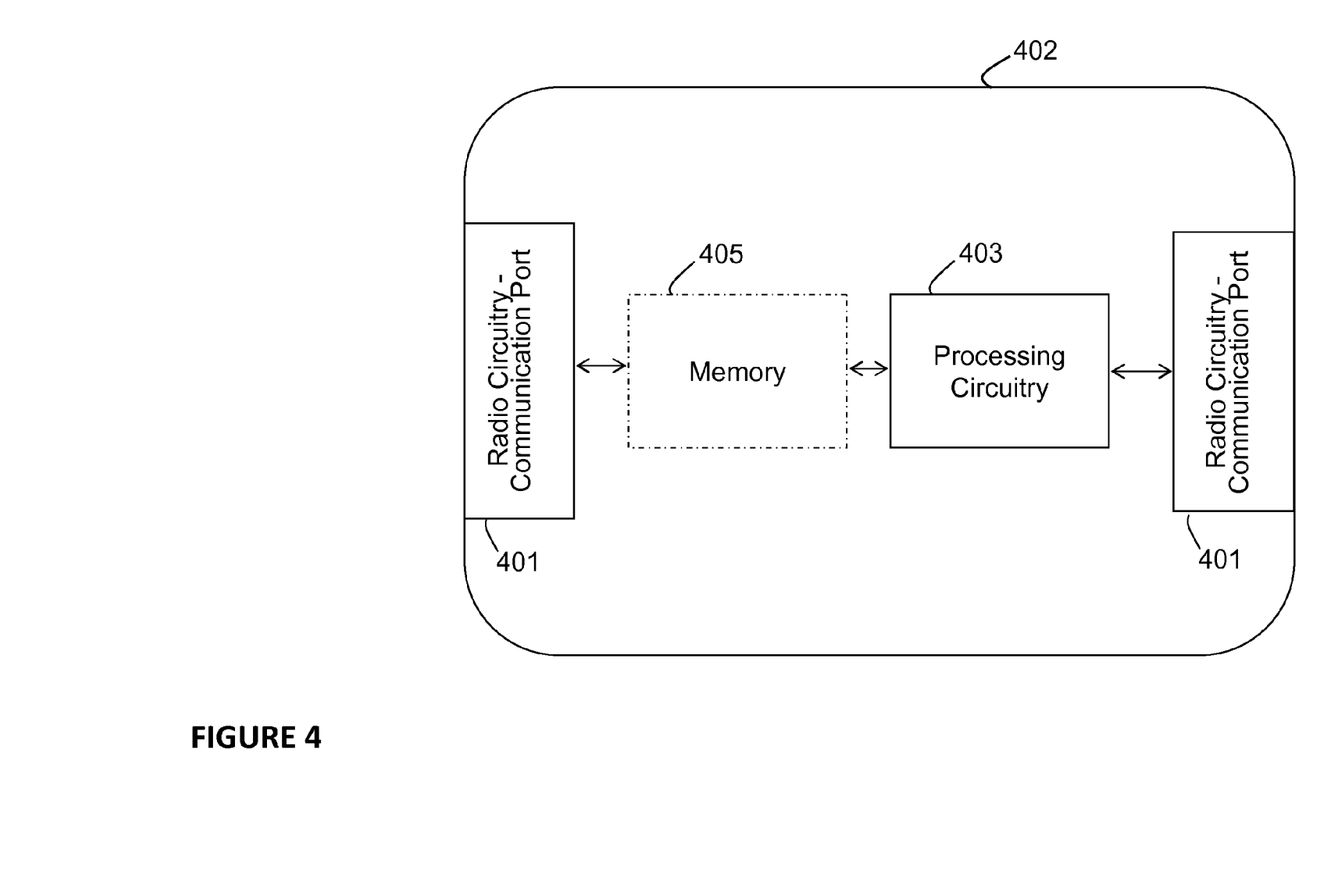
FIG. 4 is an illustration of an example node configuration of a PTC node, according to some of the example embodiments.

FIG. 4 illustrates an example node configuration of a PTC node 402. The PTC node 402 may perform any of the example embodiments described herein. The PTC node 402 may comprise radio circuitry or a communication port 401 that may be configured to receive and/or transmit communication data, instructions, and/or messages. It should be appreciated that the radio circuitry or communication port 401 may be comprised as any number of transceiving, receiving, and/or transmitting units or circuitry. It should further be appreciated that the radio circuitry or communication 401 may be in the form of any input or output communications port known in the art. The radio circuitry or communication 401 may comprise RF circuitry and baseband processing circuitry (not shown).

The PTC node 402 may also comprise a processing unit or circuitry 403 which may be configured to provide extended PMR service as described herein. The processing circuitry 403 may be any suitable type of computation unit, for example, a microprocessor, digital signal processor (DSP), field programmable gate array (FPGA), or application specific integrated circuit (ASIC), or any other form of circuitry. The PTC node 402 may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions.

Figure 5:
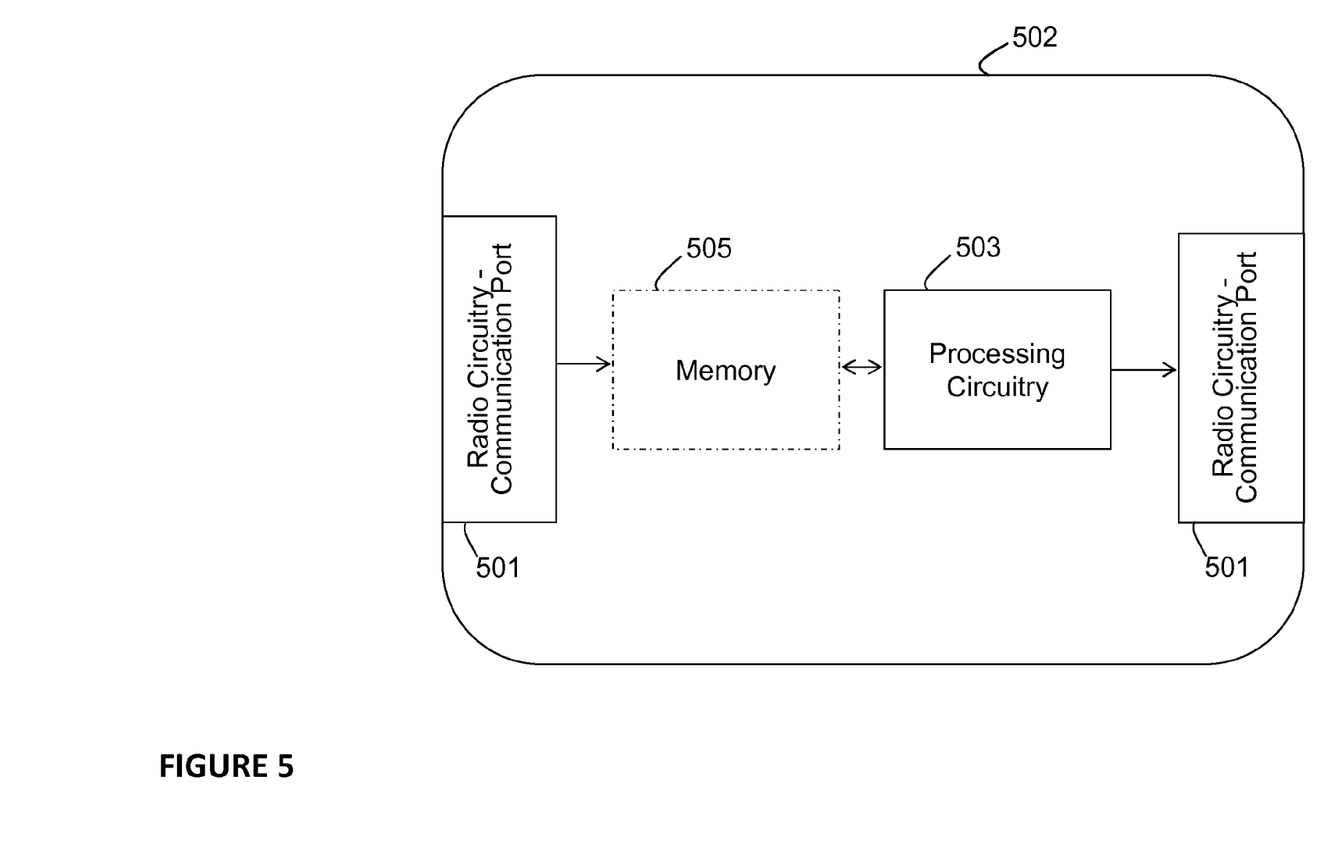
FIG. 5 is an illustration of an example node configuration of a wireless terminal, according to some of the example embodiments.

FIG. 5 illustrates an example node configuration of a wireless terminal 502 which may perform any of the example embodiments described herein. The wireless terminal 502 may comprise radio circuitry or a communication port 501 that may be configured to receive and/or transmit communication data, instructions, and/or messages. It should be appreciated that the radio circuitry or communication port 501 may be comprised as any number of transceiving, receiving, and/or transmitting units or circuitry. It should further be appreciated that the radio circuitry or communication 501 may be in the form of any input or output communications port known in the art. The radio circuitry or communication 501 may comprise RF circuitry and baseband processing circuitry (not shown).

The wireless terminal 502 may also comprise a processing unit or circuitry 503 which may be configured to participate in PMR based group communications as described herein. The processing circuitry 503 may be any suitable type of computation unit, for example, a microprocessor, digital signal processor (DSP), field programmable gate array (FPGA), or application specific integrated circuit (ASIC), or any other form of circuitry. The wireless terminal 502 may further comprise a memory unit or circuitry 505 which may be any suitable type of computer readable memory and may be of volatile and/or non-volatile type. The memory 505 may be configured to store received, transmitted, and/or measured data, device parameters, communication priorities, and/or executable program instructions.

Figure 6:
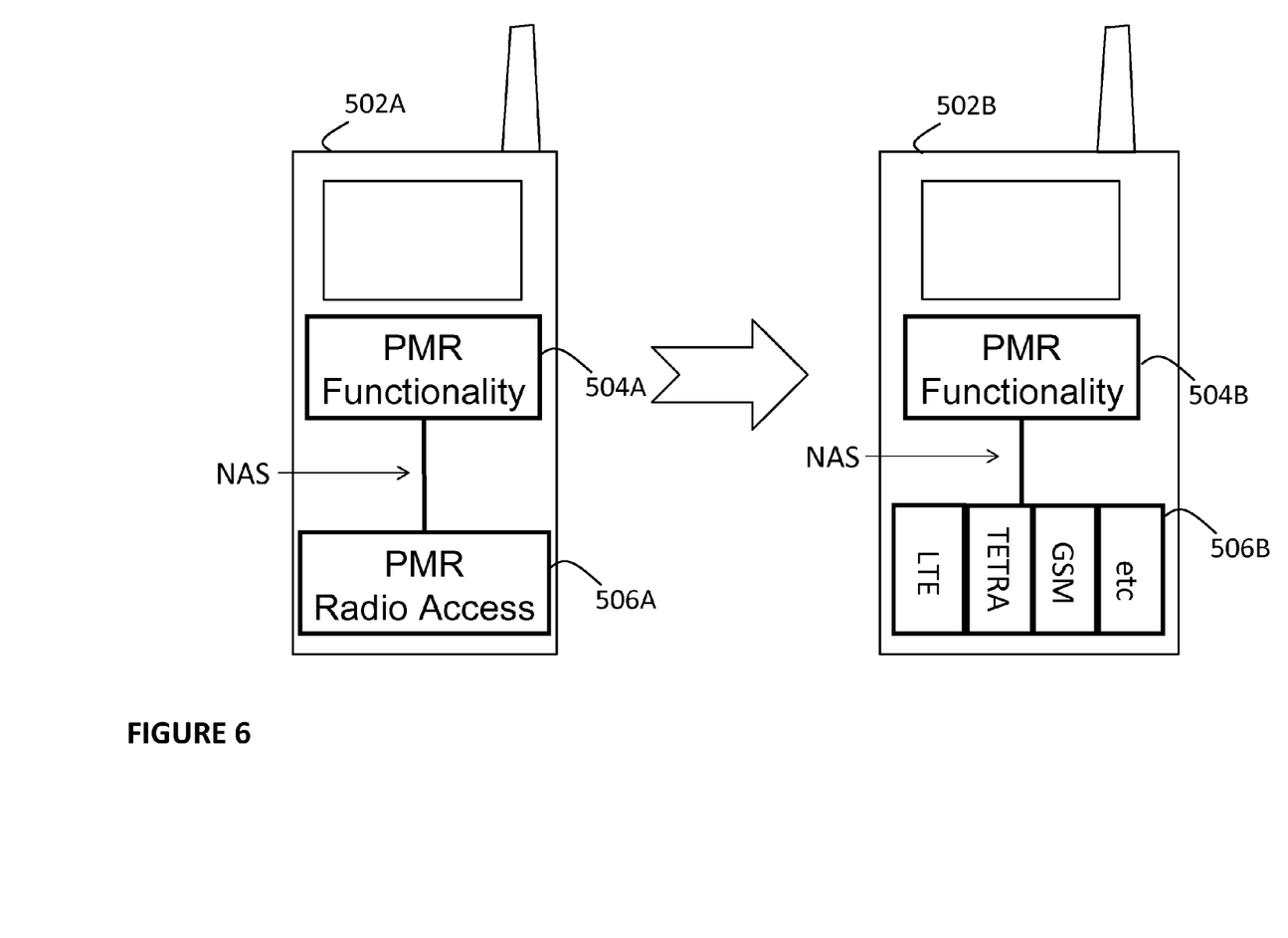
FIG. 6 is an illustration of the functionality distribution of a single functioning and dual functioning wireless terminal, according to some of the example embodiments.

FIG. 6 illustrates the functionality division of a single functioning wireless terminal 502A and a dual functioning wireless terminal 502B, according to some of the example embodiments. As illustrated in FIG. 6, the processing circuitry of the single and dual functioning wireless terminals may be separated in various components. This functionality separation may comprise a separate PMR functionality component 504A and 504B for the single and dual functioning wireless terminal, respectively. The PMR functionality components 504A and 504B may provide operations dealing with the receiving or sending of PMR based group communications.

The wireless terminals 502A and 502B may also comprise a separate radio access component 506A and 506B, respectively. As shown in FIG. 6, the single functioning wireless terminal 502A comprises a PMR radio access component 506A. Thus, the single wireless terminal 502A may be a PMR based device which is not capable of directly connecting to a public radio access based network. In contrast, the dual functioning wireless terminal 502B may comprise any number of radio access subcomponents for operations dealing with obtaining access to different RAT based networks. In the example provided by FIG. 6, the dual functioning wireless terminal 502B is configured to LTE, TETRA and GSM radio access. According to some of the example embodiments, with the separation of functionality, PMR based services may seamlessly be provided to any type of wireless terminal via the PTC node 402. It should be appreciated that the PTC node 402 may extend the (Non-access Stratum) signalling over the radio functionality (as indicated by the NAS label in FIG. 6) and forward this over the public radio access based network. The wireless terminal may then connect its PMR functionality to the received NAS signalling. Thereby, no transcoding or opening up of the PMR based network is required as would have been if a bridging at the functional level (e.g. voice codec and service translations) in the architecture stack would have taken place. The PMR functionality at both ends will not be aware the NAS is used and the PMR RAN is omitted in the transmission.

Figure 7:
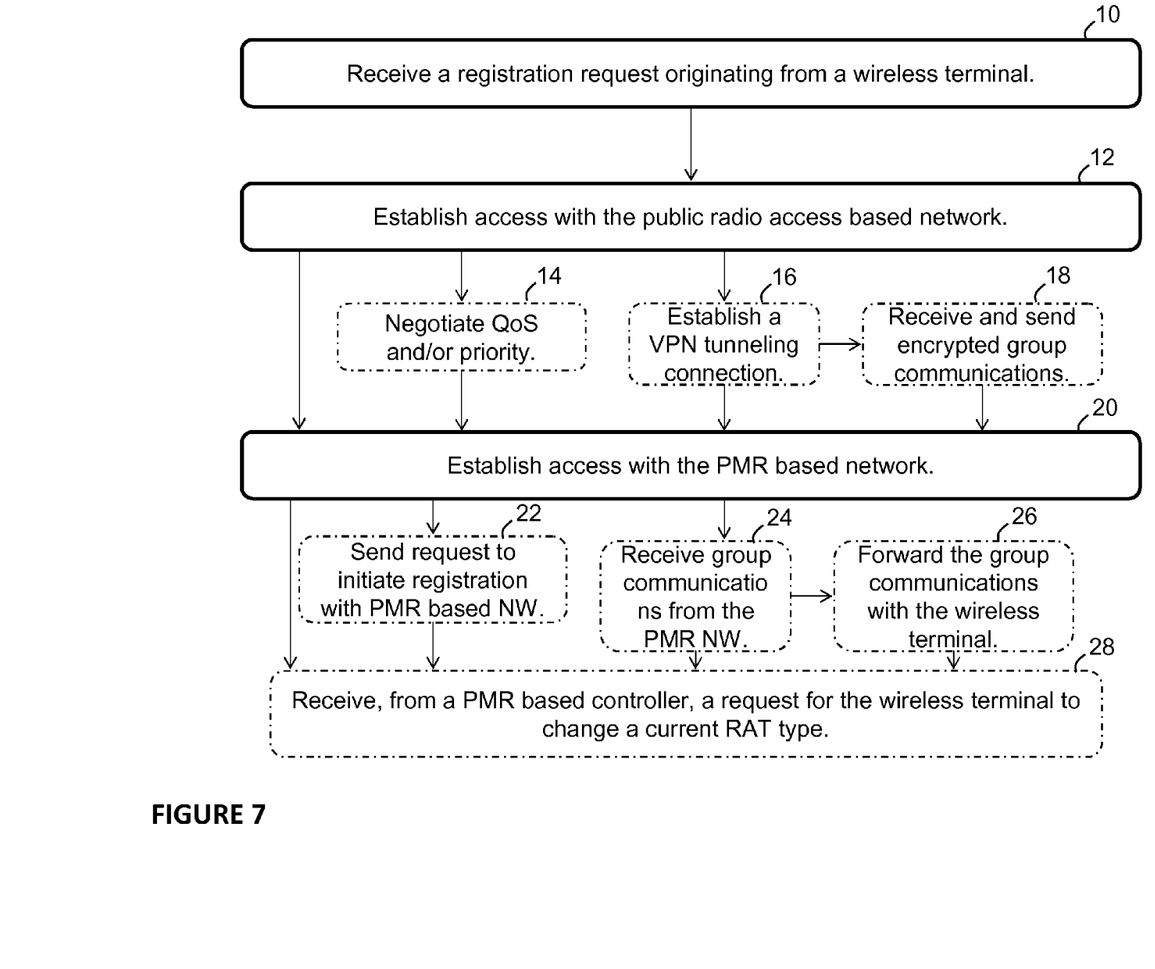
FIG. 7 is a flow diagram depicting example operations of the PTC node of FIG. 4, according to some of the example embodiments.

FIG. 7 is a flow diagram depicting example operations which may be taken by the PTC node 402 as described herein for extending PMR based services. It should also be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 10

The PTC node 402 is configured to receive 10, from a gateway node (e.g., PGW 119) in the public radio access based network 100, a registration request originating from a wireless terminal 502. The registration request comprises identification information for the wireless terminal 502. The radio circuitry 401 is configured to receive, from the gateway node in the public radio access based network 100, the registration request originating from the wireless terminal 502.

According to some of the example embodiments, the identification information may comprise any one or more of a IMEI, IMSI, a user login name and password for PMR services or group communications, a return address of the wireless terminal, and/or a key set identifier associated with the wireless terminal. The key set identifier may be used for authentication and/or encryption purposes. It should be appreciated that operation 10 is described in at least FIG. 2 with respect to at least message 1.

Operation 12

The PTC node 402 is further configured to establish 12 access with the public radio access based network on behalf of the wireless terminal. The establishment is performed with the use of the identification information, as explained in operation 10. The processing circuitry 403 is configured to establish access with the public radio access based network on behalf of the wireless terminal. It should be appreciated that operation 12 is described in at least FIG. 2 with respect to at least any of messages 1 through 6.

Example Operation 14

According to some of the example embodiments, the establishing 12 may further comprise negotiating 14, with a PCRF of the public radio access based network 100, QoS and/or priority settings for group communications to and from the wireless terminal 502. The processing circuitry 403 may be configured to negotiate, with the PCRF of the public radio access based network 100, QoS and/or priority settings for group communications to and from the wireless terminal 502. It should be appreciated that operation 12 is described in at least FIG. 2 with respect to at least any of messages 4 through 6.

Example Operation 16

According to some of the example embodiments, the establishing 12 may further comprise establishing 16 a VPN tunnelling connection. The endpoints of the VPN tunnelling connection are comprised within the wireless terminal 502 and the PTC node 402. The processing circuitry 403 is configured to establish the VPN tunnelling connection. It should be appreciated that operation 16 is described in at least FIG. 2 with respect to message 5 and FIG. 3.

Example Operation 18

According to some of the example embodiments, the PTC node 402 may be further configured to receive and send 18, from and to the wireless terminal 502, respectively, encrypted group communications. The radio circuitry 401 is configured to receive and send, from and to the wireless terminal 502, respectively, the encrypted group communications. It should be appreciated that operation 18 is described in at least FIG. 2 with respect to message 5 and FIG. 3.

Operation 20

The PTC node 402 is further configured to establish 20 access with the PMR based network on behalf of the wireless terminal 502. The establishment is provided with the use of the identification information, as described in operation 10. The processing circuitry 403 is configured to establish access with the PMR based network 200 on behalf of the wireless terminal 502. It should be appreciated that operation 20 is described in at least FIG. 2 with respect to any of messages 7 through 9.

Example Operation 22

According to some of the example embodiments, the wireless terminal 502 may be configured to be served by the public radio access network 100 and the PMR based network 200 (e.g., the wireless terminal has dual functionality). According to these example embodiments, if the wireless terminal 502 has not previously registered with the PMR based network, the establishing 20 further comprises sending 22, to the wireless terminal, a request to initiate a registration procedure with the PMR based network. The radio circuitry 401 may send, to the wireless terminal, the request to initiate the registration procedure with the PMR based network. This request may, for example, be provided in the complete message as described in message 6 of FIG. 2.

Example Operation 24

According to some of the example embodiments, the wireless terminal 502 may be configured to be served only by the public radio access based network 100 (e.g., the wireless terminal has single functionality). According to these example embodiments, the establishing 20 may further comprise receiving 24, from the PMR based network, group communications for the wireless terminal. The radio circuitry 401 may be configured to receive, from the PMR based network, group communications for the wireless terminal.

Example Operation 26

According to some of the example embodiments, where the wireless terminal 502 may be configured to be served only by the public radio access based network 100, the establishing 20 and receiving 24 may further comprise forwarding 26, to the wireless terminal, the received group communications. The radio circuitry 401 may be configured to forward, to the wireless terminal, the received group communications.

Thus, even a wireless terminal which is not able to be served by the PMR based network 200 may receive messages from the PMR based network. The PTC node 402 may function as a messenger for the PMR based network by forwarding any communications between the wireless terminal and the PMR based network.

Example Operation 28

According to some of the example embodiments, the wireless terminal may be configured to be served by the public radio access based network 100 and the PMR based network 200 (e.g., the wireless terminal has dual functionality). In such example embodiments, the PTC node 402 may be further configured to receive 28, from a PMR based controller 215, a request for the wireless terminal 502 to change a current used RAT type. The currently used RAT type may be associated with the public radio access based network or the PMR based network. It should also be appreciated that the RAT type may be associated with any other form of radio access, for example WiFi. The radio circuitry is configured to receive, from the PMR based controller, the request for the wireless terminal to change the currently used RAT type.

It should be appreciated that the request may also be to initiate a handover procedure. In such a request, the PTC node 402 may function as a base station for the wireless terminal, which may not be able to or is not directly connected to the PMR based network. The decision to have the PTC node 402 function as a base station may be provided based on measurement reports provided by the wireless terminal or forwarded by the PTC node to trigger a handover to the PMR based network. Furthermore, it should be appreciated that the wireless terminal may provide the PTC node 402 in a generated list of possible base stations the wireless terminal may be handed over to.

Figure 8:
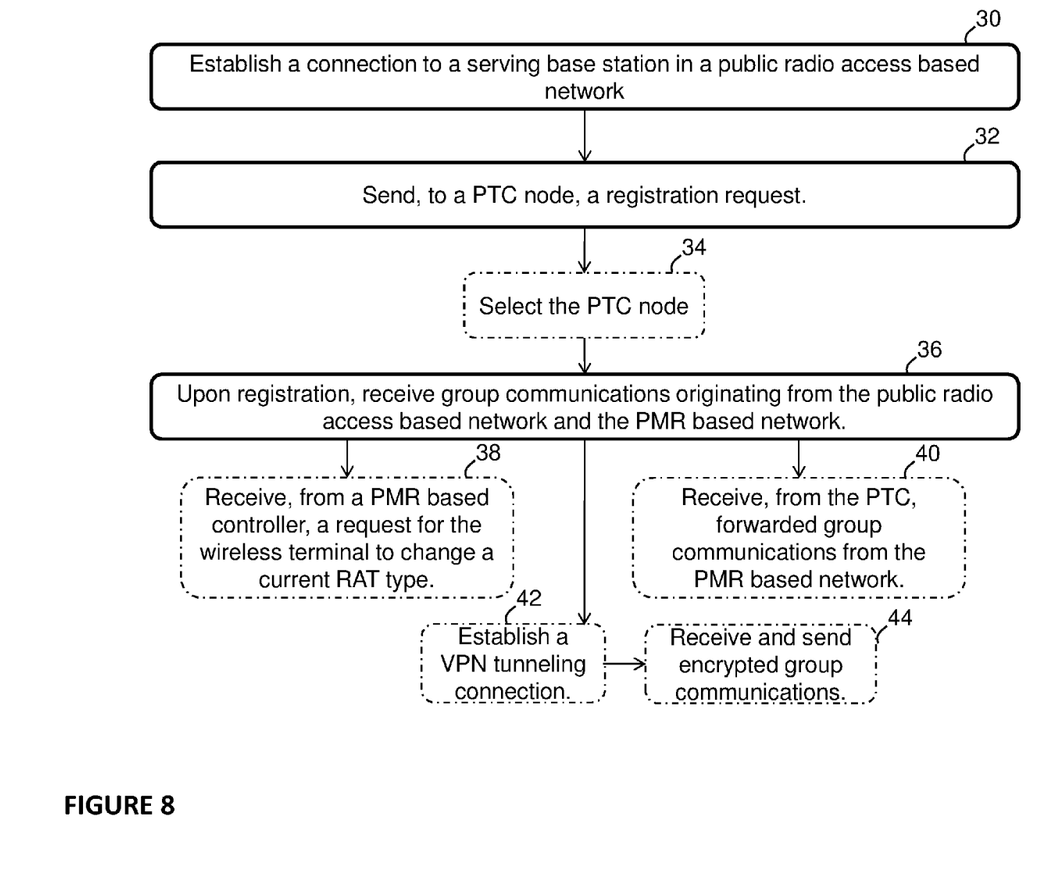
FIG. 8 is a flow diagram depicting example operations of the wireless terminal of FIGS. 5 and 6, according to some of the example embodiments.

FIG. 8 is a flow diagram depicting example operations which may be taken by the wireless terminal 502 as described herein for receiving extended PMR based services. It should also be appreciated that FIG. 8 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 30

The wireless terminal 502 is configured to establish 30 a connection to a serving base station 104 in the public radio access network 100. The processing circuitry 503 is configured to establish the connection to the serving base station in the public radio access network.

Operation 32

The wireless terminal 502 is further configured to send 32, to the PTC node 402, a registration request. The radio circuitry 501 is configured to send, to the PTC node, the registration request. It should be appreciated that such registration request is further described in at least message 4 of FIG. 2.

Example Operation 34

According to some of the example embodiments, the sending 32 may further comprise selecting 34 the PTC node to which the registration request of operation 32 is sent to. The processing circuitry 503 may be configured to select the PTC node. It should be appreciated that such selection may be provided via any one or more of a table within the wireless terminal of available PCTs, a Domain Name Server lookup request, subscription based information, retrieved information from a HSS, a HLR and/or a PCRF, and/or an internal wireless terminal configuration.

Operation 36

The wireless terminal 502 is further configured to receive 36 group communications originating from the public radio access based network 100 and the PMR based network 200. The radio circuitry 501 is configured to receive the group communications originating from the public radio access based network and the PMR based network. It should be appreciated that such receiving from the two different networks need not occur simultaneously.

Example Operation 38

According to some of the example embodiments, the wireless terminal 502 may be configured to be served by the public radio access based network 100 and the PMR based network 200. According to these example embodiments, the wireless terminal may be further configured to receive 38, from the PTC node 402, a request to change a currently used RAT type. The current used RAT type may be associated with a public radio access network or a PMR based network. It should also be appreciated that the RAT type may be associated with any other form of radio access, for example WiFi. The radio circuitry 501 is configured to receive, from the PTC node, the request to change the currently used RAT type.

It should be appreciated that the request may also be to initiate a handover procedure. In such a request, the PTC node 402 may function as a base station for the wireless terminal, which may not be able to or is not directly connected to the PMR based network. The decision to have the PTC node 402 function as a base station may be provided based on measurement reports provided by the wireless terminal. Furthermore, it should be appreciated that the wireless terminal may provide the PTC node 402 in a generated list of possible base stations the wireless terminal may be handed over to.

Example operation 40

According to some of the example embodiments, the wireless terminal may be configured to be served only by the public radio access based network. According to these example embodiments, the wireless terminal 502 may be further configured to receive 40, from the PTC node 402, forwarded group communications. The forwarded group communications originate from the PMR based network. The radio circuitry 501 is configured to receive, from the PTC node, the forwarded group communications.

Thus, even a wireless terminal which is not able to be served by the PMR based network 200 may receive messages from the PMR based network. The PTC node 402 may function as a messenger for the PMR based network by forwarding any communications between the wireless terminal and the PMR based network.

Example Operation 42

According to some of the example embodiments, the wireless terminal 502 may be further configured to establish 42 a VPN tunnelling connection. The endpoints of the VPN tunnelling connection are comprised within the wireless terminal and the PTC node 402. The processing circuitry 503 is configured to establish the VPN tunnelling connection. It should be appreciated that this operation is described further with respect to at least message 5 of FIG. 2.

Example Operation 44

According to some of the example embodiments, the establishing 42 may further comprise receiving and sending 44, from and to the PTC node, respectively, encrypted group communications. The radio circuitry 501 may be configured to receive and send, from and to the PTC node, respectively, the encrypted group communications.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

It should further be appreciated that the term group communications should not be limited to communications which are sent to multiple users at once. The term group communications may also comprise one-to-one PMR based communications, user states, geographical locations, system heartbeat, etc.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following list of claims.

The invention claimed is:

1. A method, in a Private Mobile Radio, PMR, Tunnelling Controller, PTC, node for extending PMR group communications to a public radio access based network for a wireless terminal, said wireless terminal being served by the public radio access based network and a PMR based network, the method comprising:

receiving, from a gateway node in the public radio access based network, a registration request originating from the wireless terminal, said registration request comprising identification information for the wireless terminal;

establishing access with the public radio access based network on behalf of the wireless terminal utilizing said identification information; and establishing access with the PMR based network on behalf of the wireless terminal utilizing said identification information;

wherein the establishing further comprises establishing a Virtual Private Network, VPN, tunnelling connection, wherein endpoints of said VPN tunnelling connection are comprised within the wireless terminal and the PTC node.

2. The method of claim 1, wherein the identification information comprises any one or more of an International Mobile Equipment Identity, International Mobile Subscriber Identity, a user login name and password for said PMR group communications, a return address of the wireless terminal, and/or a key set identifier associated with the wireless terminal.

3. The method of claim 1, wherein the establishing further comprises negotiating, with a Policy Control and Charging Rules Function node of the public radio access based network, quality of service and/or priority settings for group communications to and from the wireless terminal.

4. The method of claim 1, further comprising receiving and sending, from and to the wireless terminal, respectively, encrypted group communications.

5. The method of claim 1, wherein the wireless terminal is configured to be served by the public radio access based network and the PMR based network, if said wireless terminal has not previously registered with the PMR based network, the establishing further comprises sending, to the wireless terminal, a request to initiate a registration procedure with the PMR based network.

6. The method of claim 1, wherein the wireless terminal is configured to be served only by the public radio access based network, the establishing further comprises:
receiving, from the PMR based network, group communications for the wireless terminal; and
forwarding, to the wireless terminal, the received group communications.

7. The method of claim 1, wherein the wireless terminal is configured to be served by the public radio access based network and the PMR based network, the method further comprising receiving, from a PMR based network controller, a request for the wireless terminal to change a currently used Radio Access Type, RAT, wherein said currently used RAT is associated with the public radio access based network or the PMR based network.

8. The method of claim 1, wherein the PTC node functions as a base station serving the wireless terminal, wherein said wireless terminal is not directly connected to the PMR based network.

9. A Private Mobile Radio, PMR, Tunnelling Controller, PTC, node for extending PMR group communications to a public radio access based network for a wireless terminal, said wireless terminal being served by the public radio access based network and a PMR based network, the PTC node comprising:
radio circuitry configured to receive, from a gateway node in the public radio access based network, a registration request originating from the wireless terminal, said registration request comprising identification information for the wireless terminal;

processing circuitry configured to establish access with the public radio access based network on behalf of the wireless terminal utilizing said identification information; and the processing circuitry further configured to establish access with the PMR based network on behalf of the wireless terminal utilizing said identification information;

wherein the processing circuitry is further configured to establish a Virtual Private Network, VPN, tunnelling connection, wherein endpoints of said VPN tunnelling connection are comprised within the wireless terminal and the PTC node.

10. The PTC node of claim 9, wherein the identification information comprises any one or more of an International Mobile Equipment Identity, International Mobile Subscriber Identity, a user login name and password for said PMR group communications, a return address of the wireless terminal, and/or a key set identifier associated with the wireless terminal.

11. The PTC node of claim 9, wherein the processing circuitry is further configured to negotiate, with a Policy Control and Charging Rules Function node of the public radio access based network, quality of service and/or priority settings for group communications to and from the wireless terminal.

12. The PTC node of claim 9, wherein the radio circuitry is further configured to receive and/or send, from and to the wireless terminal, respectively, encrypted group communications.

13. The PTC node of claim 9, wherein the wireless terminal is configured to be served by the public radio access based network and the PMR based network, if said wireless terminal has not previously registered with the PMR based network, the radio circuitry is further configured to send, to the wireless terminal, a request to initiate a registration procedure with the PMR based network, in the establishment of access to the PMR based network.

14. The PTC node of claim 9, wherein the wireless terminal is configured to be served only by the public radio access based network, the radio circuitry is further configured to receive, from the PMR based network, group communications for the wireless terminal; and the radio circuitry is further configured to forward, to the wireless terminal, the received group communications.

15. The PTC node of claim 9, wherein the wireless terminal is configured to be served by the public radio access based network and the PMR based network, the radio circuitry is further configured to receive, from a PMR based network controller, a request for the wireless terminal to change a currently used Radio Access Type, RAT, wherein said currently used RAT is associated with the public radio access based network or the PMR based network.

16. The PTC node of claim 9, wherein the PTC node functions as a base station serving the wireless terminal, wherein said wireless terminal is not directly connected to the PMR based network.

17. A method, in a wireless terminal, for participating in group communications with a public radio access based network and a Private Mobile Radio, PMR, based network, the method comprising:

establishing a connection to a serving base station in the public radio access based network;

sending, to a PMR Tunnelling Controller, PTC, node, a registration request; and upon registering with the PTC node, receiving a group communication originating from the public radio access based network and the PMR based network through a Virtual Private Network, VPN, tunnelling connection established by the PTC node and having endpoints within the wireless terminal and the PTC node.

18. The method of claim 17, wherein the sending further comprises selecting the PTC node, wherein said selecting is provided via any one or more of a table within the wireless terminal of available PTC nodes, a Domain Name Server lookup request, subscription based information, retrieved information from a Home Subscriber Server, a Home Location Register and/or a Policy and Charging Rules Function, and/or an internal wireless terminal configuration.

19. The method of claim 17, wherein the wireless terminal is configured to be served by the public radio access based network and the PMR based network, the method further comprising receiving, from the PTC node, a request to change a currently used Radio Access Type, RAT, wherein said currently used RAT is associated with the public radio access based network or the PMR based network.

20. The method of claim 17, wherein the wireless terminal is configured to be served only by the public radio access based network, the method further comprising receiving, from the PTC node, forwarded group communications, said group communications originating from the PMR based network.

21. The method of claim 17, further comprising establishing the VPN tunnelling connection having endpoints within the wireless terminal and the PTC node.

22. The method of claim 21, further comprising receiving and sending, from and to the PTC node, respectively, encrypted group communications.

23. A wireless terminal for participating in group communications with a public radio access based network and a Private Mobile Radio, PMR, based network, the wireless terminal comprising:

processing circuitry configured to establish a connection to a serving base station in the public radio access based network;

radio circuitry configured to send, to a PMR Tunnelling Controller, PTC, node a registration request; and upon registering with the PTC node, the radio circuitry configured to receive a group communication originating from the public radio access based network and the PMR based network through a Virtual Private Network, VPN, tunnelling connection established by the PTC node and having endpoints within the wireless terminal and the PTC node.

24. The wireless terminal of claim 23, wherein the processing circuitry is further configured to select the PTC node via any one or more of a table within the wireless terminal of available PTC nodes, a Domain Name Server lookup request, subscription based information, retrieved information from a Home Subscriber Server, a Home Location Register and/or a Policy and Charging Rules Function, and/or an internal wireless terminal configuration.

25. The wireless terminal of claim 23, wherein the wireless terminal is configured to be served by the public radio access based network and the PMR based network, the radio circuitry is further configured to receive, from the PTC node, a request to change a currently used Radio Access Type, RAT, wherein said currently used RAT is associated with the public radio access based network or the PMR based network.

26. The wireless terminal of claim 23, wherein the wireless terminal is configured to be served only by the public radio access based network, the radio circuitry is further configured to receive, from the PTC node, forwarded group communications, said group communications originating from the PMR based network.

27. The wireless terminal of claim 23, wherein the processing circuitry is further configured to establish the VPN tunnelling connection having endpoints within the wireless terminal and the PTC node.

28. The wireless terminal of claim 27, wherein the radio circuitry is further configured to receive and send, from and to the PTC node, respectively, encrypted group communications.

* * * * *